(12) United States Patent
Gansohr

(10) Patent No.: US 8,718,882 B2
(45) Date of Patent: May 6, 2014

(54) METHOD FOR CONTROLLING A TRANSMISSION BRAKE

(75) Inventor: Marcus Gansohr, Salem (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 13/581,329

(22) PCT Filed: Feb. 14, 2011

(86) PCT No.: PCT/EP2011/052088
§ 371 (c)(1),
(2), (4) Date: Aug. 27, 2012

(87) PCT Pub. No.: WO2011/110400
PCT Pub. Date: Sep. 15, 2011

(65) Prior Publication Data
US 2012/0330519 A1 Dec. 27, 2012

(30) Foreign Application Priority Data
Mar. 11, 2010 (DE) .......................... 10 2010 002 764

(51) Int. Cl.
*F16H 3/38* (2006.01)
*F16H 57/10* (2006.01)
*B60W 10/10* (2012.01)

(52) U.S. Cl.
USPC ............... 701/51; 701/58; 74/339; 74/411.5; 477/34

(58) Field of Classification Search
USPC ................ 701/51, 58, 59, 67; 74/339, 411.5; 192/220; 477/34, 56
See application file for complete search history.

(56) References Cited

U.S. PATENT DOCUMENTS 6,050,384 A * 4/2000 Hammond ............... 192/221
7,337,052 B2 2/2008 Steinborn et al.
(Continued)

FOREIGN PATENT DOCUMENTS

| DE | 196 52 916 A1 | 6/1998 |
| DE | 103 05 254 A1 | 8/2004 |

(Continued)

OTHER PUBLICATIONS

Mertinkat, DE 196 52 916 A1 (Machine Translation).*

(Continued)

*Primary Examiner* — Fadey Jabr
*Assistant Examiner* — Courtney Heinle
(74) *Attorney, Agent, or Firm* — Davis & Bujold, PLLC; Michael J. Bujold

(57) ABSTRACT

A method of controlling a transmission brake that is actuated by inlet and outlet valves. For determining when to transmit a disengagement signal for opening the outlet valve, the current input and output speeds are determined and the respective gradients of these speeds are calculated. Variation of the input speed, during the disengagement of the brake, is determined as a function of the input gradient, the optimum time for reaching the synchronous speed, during brake disengagement, is determined from the input speed variation as a function of the output gradient, and the time interval until transmission of the disengagement signal is determined as a function of the current input and output speeds and their gradients, by a back-calculation from the time when the synchronous speed is reached, taking a disengagement dead time of the brake, between transmitting the disengagement signal and start of disengagement, into account.

20 Claims, 3 Drawing Sheets

(56) References Cited

U.S. PATENT DOCUMENTS

| | | |
|---|---|---|
| 7,370,548 B2 | 5/2008 | Bachmann et al. |
| 8,332,109 B2 * | 12/2012 | Otanez et al. ............. 701/60 |
| 2006/0142919 A1 * | 6/2006 | Steinborn et al. ............. 701/51 |
| 2006/0179963 A1 * | 8/2006 | Bachmann et al. ............. 74/339 |
| 2006/0224291 A1 * | 10/2006 | Geist et al. ............. 701/51 |
| 2007/0042865 A1 * | 2/2007 | Steen et al. ............. 477/182 |
| 2007/0045865 A1 | 3/2007 | Tang et al. |
| 2008/0228431 A1 * | 9/2008 | Guggolz et al. ............. 702/147 |
| 2010/0151992 A1 * | 6/2010 | Kramer et al. ............. 477/86 |
| 2011/0021315 A1 * | 1/2011 | Dobele et al. ............. 477/71 |
| 2012/0330520 A1 * | 12/2012 | Ulbricht ............. 701/51 |

FOREIGN PATENT DOCUMENTS

| | | |
|---|---|---|
| DE | 103 30 517 A1 | 3/2005 |
| DE | 10 2005 032 225 B3 | 8/2006 |
| DE | 10 2008 001 686 A1 | 11/2009 |

OTHER PUBLICATIONS

German Search Report Corresponding to 10 2010 002 764.2.

International Search Corresponding to PCT/EP2011/052088.

Written Opinion Corresponding to PCT/EP2011/052088.

\* cited by examiner

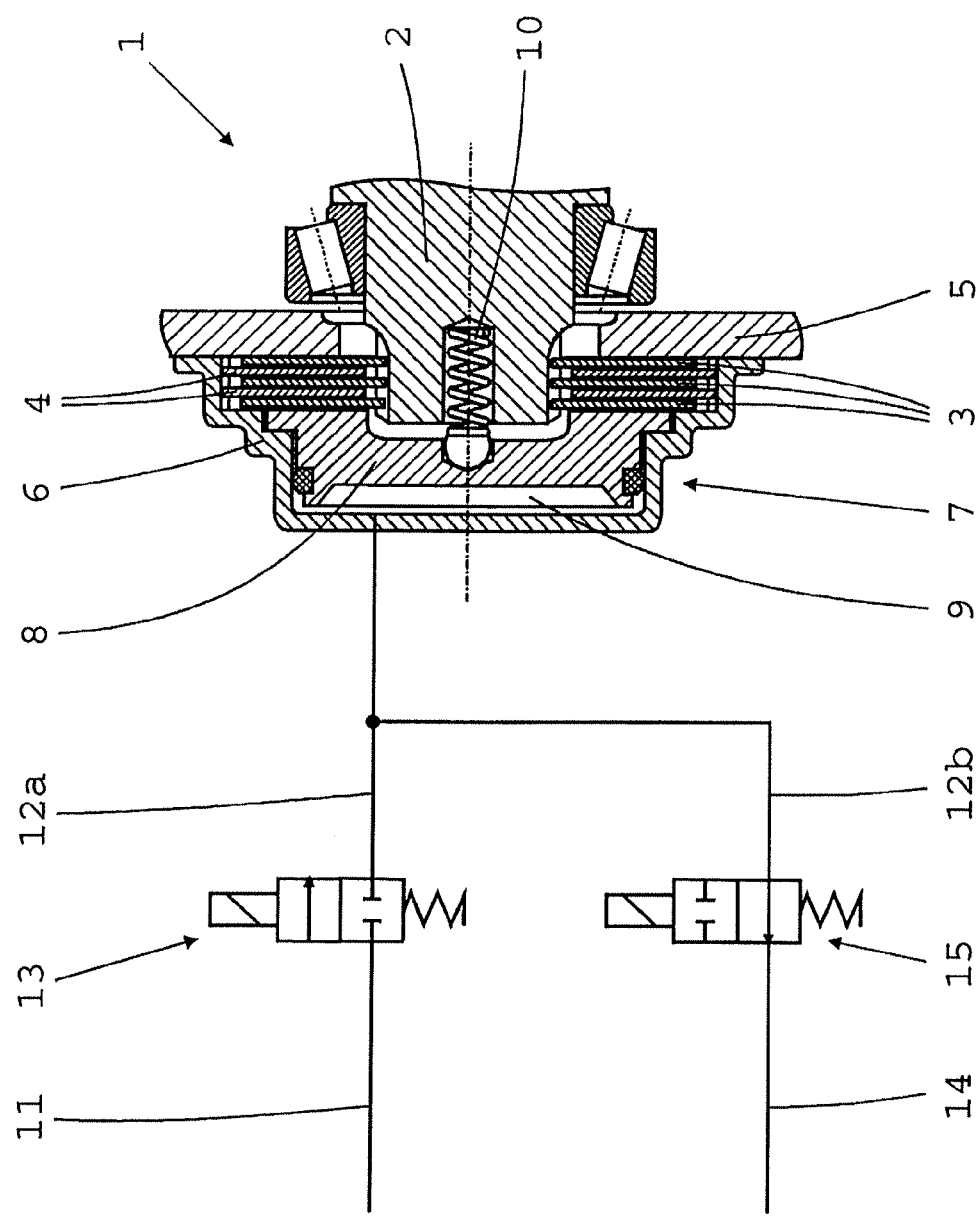

METHOD FOR CONTROLLING A TRANSMISSION BRAKE

This application is a National Stage completion of PCT/EP2011/052088 filed Feb. 14, 2011, which claims priority from German patent application serial no. 10 2010 002 764.2 filed Mar. 11, 2010.

FIELD OF THE INVENTION

The invention concerns a method for controlling a transmission brake of an automated variable-speed transmission of countershaft design provided with claw clutches, the brake being functionally connected to a transmission shaft on the input side and being hydraulically or pneumatically actuated by means of an inlet valve and an outlet valve each made as a 2/2-way magnetic switching valve, such that for an upshift from a gear under load to a target gear, once the loaded gear has been disengaged, for the synchronization of the target gear the inlet valve is first opened and the outlet valve is closed, once a braking torque has been set the inlet valve is closed, and during the braking of the transmission shaft on the input side the time until the output of a deactivation signal for opening the outlet valve is determined as a function of an input speed and its gradient and of an output speed and its gradient, in such manner that after the transmission brake has been deactivated the input speed corresponds approximately to a predetermined synchronous speed.

BACKGROUND OF THE INVENTION

A transmission of countershaft design intended for longitudinal fitting usually comprises an input shaft, at least one countershaft and an output shaft. The input shaft can be connected to and disconnected from the driveshaft of the drive engine by an engine clutch that acts as a starting and shifting clutch. The countershaft is arranged axis-parallel to the input shaft and is in permanent driving connection therewith by way of an input constant usually formed by a spur gearwheel pair with two fixed wheels arranged in a rotationally fixed manner on the respective transmission shaft (the input shaft and the countershaft). The output shaft is arranged axis-parallel to the countershaft and coaxially with the input shaft, and can be connected selectively to the countershaft by way of a number of gears with different gear ratios. The gears are usually formed as spur gearwheel pairs, each with a fixed wheel arranged in a rotationally fixed manner on one of the transmission shafts (countershaft or output shaft) and a loose wheel mounted to rotate on the other transmission shaft (output shaft or countershaft). To engage a gear, i.e. to produce a drive connection between the countershaft and the output shaft with the gear ratio of the gear concerned, a gear clutch is associated with each loose wheel. The loose wheels of adjacent gears are usually arranged at least in pairs on the same transmission shaft, so that the gear clutches are correspondingly combined in pairs in shifting packets, each with a common shifting sleeve.

The shifting sequence for an upshift from a gear under load to a higher target gear generally begins when the torque delivered by the drive engine is reduced and at approximately the same time the engine clutch is opened, before the loaded gear is disengaged. Thereafter the target gear is synchronized, in that the input speed, i.e. the speed on the input side of the gear clutch of the target gear, which is determined by the speed of the input shaft or the countershaft, is reduced to the synchronous speed on the output side of the gear clutch of the target gear, determined by the speed of the output shaft. Then the target gear is engaged and after that, at approximately the same time, the engine clutch is closed and the torque delivered by the drive engine is increased again. In automated transmissions the input speed is usually detected by means of a speed sensor arranged on the input shaft whereas the output speed is detected by a speed sensor arranged on the output shaft. For the two speeds to be comparable it is necessary to relate them to a single transmission shaft, i.e. to convert them correspondingly. However, since particularly with an arrangement of the loose wheels on the countershaft and the output shaft alternating in pairs it would be relatively complicated to convert the respective speeds at the relevant transmission shaft for the gear clutch of the target gear concerned, it is usual to refer the two speeds, in each case independently of the arrangement of the loose wheel concerned, uniformly to the same transmission shaft, preferably the input shaft. For this it is only necessary to convert the output speed detected at the output shaft, by multiplication by the gear ratio of the target gear and the gear ratio of the input constant, to the input shaft, whereas the input speed detected at the input shaft can remain unchanged. In this case the conversion of the speeds, known per se, will not be dealt with explicitly; rather, the input speed and the output speed are respectively to be understood as the speeds already related to a common transmission shaft, in particular the input shaft.

In general, compared with gear clutches synchronized by means of friction rings and locking gear teeth, unsynchronized gear clutches of the type known as claw clutches have a much simpler structure, lower production costs, more compact dimensions and substantially less susceptibility to wear and defects. In an automated transmission provided with claw clutches, the target gear of an upshift is preferably synchronized by means of a centrally arranged controllable braking device, for example a transmission brake functionally associated with the input shaft or the countershaft. The control of a transmission brake and a shift regulator for synchronizing and engaging an unsynchronized target gear is comparatively simple compared with the control-path-dependent, adjustment-speed and adjustment-force-variable control of a shift regulator for synchronizing and engaging a synchronized target gear, since for this the sensor data from the speed sensors arranged on the input shaft and the output shaft are essentially sufficient.

A typical transmission brake of an automated transmission of countershaft design is described in DE 196 52 916 B4. This known transmission brake is in the form of a hydraulically or pneumatically actuated disk brake arranged on the end of the countershaft on the engine side. The disks of the transmission brake are connected in a rotationally fixed manner by way of inner and outer carrier teeth, alternately to the countershaft and to a brake housing fixed on the transmission housing. The transmission brake is actuated by a piston arranged to move axially in a brake cylinder, which is acted upon axially on the outside by the controllable control pressure in the pressure space of the brake cylinder and thereby pressed against the disks in opposition to the restoring force of a spring arranged between the piston and the countershaft. The control pressure acting in the pressure space is regulated by means of an inlet valve connected on the inlet side to a pressure line and an outlet valve connected on the outlet side to an unpressurized line, which on the outlet side and inlet side are respectively connected in each case by a short duct to the pressure space of the brake cylinder. The two valves can optionally be in the form of 2/2-way magnetic switching valves, which enable simple control sequences and on which the present invention is based, or 2/2-way magnetic timed valves which enable more complex regulation sequences.

DE 103 05 254 A1 describes a method for controlling a transmission brake of such type in an automated variable-speed transmission of countershaft design provided with claw clutches, in which, during the braking of the countershaft associated with an upshift, the number of program cycles or the time taken to reach the synchronous speed is determined having regard to the gradient of the output speed. This takes into account the fact that the synchronous speed determined by the output speed is not a constant, but can decrease during the shift-associated traction or thrust force interruption, for example when driving on an uphill stretch, or increase, for example on a downhill stretch. To determine the synchronous time a so-termed sum gradient is formed, which as the difference between the gradients of the output speed and of the input speed, constitutes a type of effective gradient. However, this known method assumes that when the transmission brake reaches the synchronous point it is disengaged spontaneously, i.e. without any time delay until the beginning of the disengagement process and without any steady reduction of the braking torque, whereas the reality is different.

Accordingly, in an improved method described in DE 103 30 517 A1 a lead time is provided, by virtue of which the response behavior of the control system of the transmission brake and of the transmission brake itself is taken into account. In this method the signal for disengaging the transmission brake is emitted a certain lead time before the determined synchronous time point has been reached. Moreover, in this method it is provided that the quality of upshifts is evaluated in relation to the reaching of a specified target speed window at the moment when the gear clutch of the target gear is engaged, and the lead time is left unchanged, corrected or recalculated as a function of the quality of the upshift concerned. In this known method, however, the steady decrease of the braking torque of the transmission brake during the disengagement process and the influence of operating parameters, such as the operating temperature of the transmission brake, on the response behavior and the disengagement process are not explicitly determined and are consequently taken into account only approximately by the lead time, which results in certain inaccuracy of the method.

SUMMARY OF THE INVENTION

Accordingly, the purpose of the present invention is to indicate a method for controlling a transmission brake of the type mentioned earlier, in an automated variable-speed transmission of countershaft design and provided with claw clutches, by virtue of which the control properties of the transmission brake are taken into account more accurately so that the shifting quality of upshifts of the transmission is further improved.

According to the invention, this objective is achieved in that the current input speed $n_{E\_akt}$ and the current output speed $n_{A\_akt}$ are determined by sensors and from these, respectively, the gradients of the input speed $\Delta n_E/\Delta t$ and of the output speed $\Delta n_A/\Delta t$ are calculated, the speed variation of the input speed $n_E(t)$ during the imminent disengagement process of the transmission brake as a function of the gradient of the input speed $\Delta n_E/\Delta t$ is determined by means of a quadratic time function, the optimum time $t_{Sync}$ for reaching the synchronous speed $n_{Sync}$ during the disengagement process of the transmission brake is determined by means of the speed variation of the input speed $n_E(t)$ as a function of the gradient of the output speed $\Delta n_A/\Delta t$, and the time interval until the emission of the disengagement signal $T_{SA}$ is determined as a function of the current input speed $n_{E\_akt}$ and its gradient $\Delta n_E/\Delta t$ and of the current output speed $n_{A\_akt}$ and its gradient $\Delta n_A/\Delta t$ by a back-calculation from the time $t_{Sync}$ when the synchronous speed $n_{Sync}$ is reached, taking into account a disengagement dead time $T_{TA}$ of the transmission brake between the emission of the disengagement signal ($t_{SA}$) and the beginning of the disengagement process ($t_{Abs0}$).

The invention starts from a transmission brake arranged in an automated variable-speed transmission of countershaft design and provided with claw clutches, which is functionally connected on the input side to a transmission shaft, i.e. the input shaft or a countershaft. Furthermore, in the invention it is assumed that the transmission brake can be actuated hydraulically or pneumatically by means of an inlet valve and an outlet valve, each in the form of a 2/2-way magnetic switching valve. For an upshift from a gear under load to a target gear, once the loaded gear has been disengaged, to synchronize the target gear the inlet valve is first opened and the outlet valve closed. Then, once the largely constant braking torque $M_{Br0}$ has been set, the inlet valve is closed again and during the braking of the transmission shaft on the input side the time interval until the emission of a disengagement signal $T_{SA}$ for opening the outlet valve, by which the transmission brake is deactivated, is determined. This disengagement signal interval $T_{SA}$ is determined as a function of the current input speed $n_{E\_akt}$ and its gradient $\Delta n_E/\Delta t$ and of the current output speed $n_{A\_akt}$ and its gradient $\Delta n_A/\Delta t$, in such manner that when the transmission brake has been disengaged the input speed $n_E$ corresponds approximately to a specified synchronous speed $n_{Sync}$ ($n_E \approx n_A$).

Since the speed variation of the input speed $n_E(t)$ during the imminent disengagement process of the transmission brake is determined, i.e. predicted, by means of a quadratic time function, by applying at least a suitable characteristic parameter that characterizes the decrease of the gradient $\Delta n_E/\Delta t$ of the input speed this speed variation $n_E(t)$ will correspond very closely to the actual speed variation of the input speed. Consequently, starting from the also determined optimum time point $t_{Sync}$ for reaching the synchronous speed $n_{Sync}$ and taking into account a disengagement dead time $T_{TA}$ of the transmission brake that exists in practice, namely between the emission of the disengagement signal ($t_{SA}$) and the beginning of the disengagement process ($t_{Abs0}$), the disengagement signal time interval $T_{SA}$ until the emission of the disengagement signal for opening the outlet valve is also determined with such accuracy that when the transmission brake has been deactivated the input speed $n_E$ can reach the specified synchronous speed $n_{Sync}$ with high precision ($n_E = n_A$). In a manner known per se, a small speed difference at the gear clutch of the target gear at the moment of engagement, which is entirely desirable in order to avoid a tooth-on-tooth position or to eliminate it automatically should it occur, can be produced by emitting the disengagement signal for opening the outlet valve at an earlier or later instant offset by a small interval $\Delta t_{SA}$. Compared with previously known methods for controlling a transmission brake of the type mentioned earlier, the method according to the invention is substantially more precise and therefore requires no corrective steps in practice.

In good agreement with the actual speed variations of the input speed $n_E$ and the output speed $n_A$, the gradient of the input speed $\Delta n_E/\Delta t$ up until the beginning of the disengagement process ($t_{Abs0}$) and the gradient of the output speed $\Delta n_A/\Delta t$ up until the synchronous speed $n_{Sync}$ has been reached, are in each case assumed to be constant and are calculated as a difference quotient between two currently determined consecutive speed values $n_{E\_i}, n_{E\_i-1}; n_{A\_i}, n_{A\_i-1}$ and the time interval between the determination of these speed values $t_i - t_{i-1}$, in accordance with the equations $\Delta n_E/\Delta t =$ $(n_{E\_i}-n_{E\_i-1})/(t_i-t_{i-1})$ and $\Delta n_A/\Delta t=(n_{A\_i}-n_{A\_i}-n_{A\_i-1}/(t_i-t_{i-1}))$, in which $n_{E\_i}$ and $n_{A\_i}$ are the values of the input speed $n_E$ and the output speed $n_A$ determined at time point $t_i$, and $n_{E\_i-1}$ and are the corresponding speed values determined at the prior time point $t_{i-1}$.

Since the speed signals $n_E(t)$, $n_A(t)$ detected by speed sensors can be affected by noise and/or overlaid by oscillations, for the aforesaid determination of the speed gradients $\Delta n_E/\Delta t$ and $\Delta n_A/\Delta t$ it may be necessary, previously, to smooth out the respective speed signal, for example by low-pass filtering, or a numerical method may be needed for determining the speed gradients $\Delta n_E/\Delta t$ and $\Delta n_A/\Delta t$.

The gradient of the input speed $\Delta n_E/\Delta t$ is determined essentially by the braking torque $M_{Br0}$ of the transmission brake, which is constant during the braking phase. In general, however, the input shaft is also braked by a resultant resistance torque $M_W$ produced by the bearing, gearing and flow resistances that act upon the input-side transmission shifts and gearteeth. Compared with the braking torque $M_{Br0}$ of the transmission brake the resistance torque $M_W$ is comparatively small and can be regarded as constant during the upshift process. Thus, the gradient of the input speed $\Delta n_E/\Delta t$ is composed additively of a relatively large fraction $(\Delta n_E/\Delta t)_{Br}$ produced by the braking torque $M_{Br0}$ of the transmission brake, and a relatively small fraction $(\Delta n_E/\Delta t)_W$ produced by the resistance torque $M_W$ acting on the input shaft $(\Delta n_E/\Delta t=(\Delta n_E/\Delta t)_{Br}+(\Delta n_E/\Delta t)_W)$. In the ideal case, however, the resistance torque $M_W$ is almost equal to zero and can in this case be neglected for determining the disengagement signal interval $T_{SA}$ $((\Delta n_E/\Delta t)_W=0; \Delta n_E/\Delta t=(\Delta n_E/\Delta t)_{Br})$.

Owing to its small absolute value compared with the gradient $\Delta n_E/\Delta t$ of the input speed, the gradient $\Delta n_A/\Delta t$ of the output speed can also be regarded with sufficient accuracy as constant, i.e. the speed variation of the output speed $n_A(t)$ is taken to be linear for that reason.

The speed variation of the input speed $n_E(t)$ during the disengagement process of the transmission brake can be determined from the time function:

$$n_E(t)=n_{E\_0}+\Delta n_E/\Delta t^* t+F_{Abs}^* t^2$$

in which $n_{E\_0}$ is the input speed at the beginning of the disengagement process $(t_{Abs0})$ and $F_{Abs}$ is a previously determined deactivation factor that characterizes the time variation of the disengagement process of the transmission brake. This equation results from the consideration that during the disengagement process of the transmission brake, the at first constant gradient of the input speed $\Delta n_E/\Delta t$ is reduced in accordance with a quadratic characteristic whose effect is determined by the deactivation factor $F_{Abs}$, down to the gradient of the input speed attributable to the resistance torque $M_W(\Delta n_E/\Delta t)_W$ or, if this is very small or equal to zero, down to zero.

Alternatively, however, the speed variation of the input speed $(n_E(t))$ during the disengagement process of the transmission brake can also be determined from the time function:

$$n_E(t)=n_{E\_0}+(M_{Br0}+M_W)/(J_{GE}^*2\pi)^*t-M_{Br0}/(J_{GE}^*4\pi^*T_{Abs})^*t^2$$

or from the time function:

$$n_E(t)=n_{E\_0}+\Delta n_E/\Delta t^*t-1/(2T_{Abs})^*(\Delta n_E/\Delta t)_{Br}^*t^2$$

in which $M_{Br0}$ is the braking torque of the transmission brake at the beginning of the disengagement process $(T_{Abs0})$, $M_W$ is a resistance torque acting on the input shaft of the transmission during the upshift process and assumed to be constant, $J_{GE}$ is the mass moment of inertia of the rotating components on the input-side part of the transmission, and $T_{Abs}$ is the deactivation duration of the transmission brake assuming a linear decrease of the braking torque in accordance with the equation $M_{Br}(t)=M_{Br0}(1-t/T_{Abs})$.

These two equations can be derived from the general equation of movement for rotating systems, which in the present application context is given for the input-side part of the transmission by:

$$J_{GE}^*2\pi^*dn_E/dt=M_W+M_{Br}(t).$$

By inserting the aforesaid formula for the linear decrease of the braking torque $_{Mbr}(t)$ and appropriate transformation, one obtains the relationship:

$$dn_E=M_W/(J_{GE}^*2\pi)dt+M_{Br0}/(J_{GE}^*2\pi)^*(1-t/T_{Abs})dt$$

which, by integration from t=0 (beginning of the disengagement process of the transmission brake $t_{Abs0}$) to t=t (an arbitrary time point within the disengagement process), leads to the first equation:

$$n_E(t)=n_{E\_0}+(M_{Br0}+M_W)/(J_{GE}^*2\pi)^*t-M_{Br0}/(J_{GE}^*4\pi^*T_{Abs})^*t^2.$$

From the general equation of motion for the time section previous to the disengagement process with constant deceleration:

$$J_{GE}^*2\pi^*\Delta n_E/\Delta t=J_{GE}^*2\pi^*((\Delta n_E/\Delta t)_W+(\Delta n_E/\Delta t)_{Br})=M_W M_{Br0}$$

one obtains relationships:

$$\Delta n_E/\Delta t=(M_{Br0}+M_W)/(J_{GE}^*2\pi) \text{ and } (\Delta n_E/\Delta t)_{Br}=M_{Br0}/(J_{GE}^*2\pi)$$

which, when inserted in the first equation, produce the equivalent second equation:

$$n_E(t)=n_{E\_0}+\Delta n_E/\Delta t^*t-1/(2T_{Abs})^*(\Delta n_E/\Delta t)_{Br}^*t^2.$$

The determination of the optimum time $t_{Sync}$ for reaching the synchronous speed $n_{Sync}$, as a function of the gradient of the output speed $\Delta n_A/\Delta t$, is expediently carried out in such manner that when the gradient of the output speed is larger than or equal to the gradient of the input speed attributable to the resultant resistance torque $M_W$ $(\Delta n_A/\Delta t \geq (\Delta n_E/\Delta t)_W)$, the time is determined as the time $t_{Sync}$ at which the gradient of the input speed $dn_E/dt$ reaches the value of the gradient $(\Delta n_E/\Delta t)$ $(dn_E/dt=(\Delta n_E/\Delta t))$, and when the gradient of the output speed is smaller than the gradient of the input speed attributable to the resistance torque $M_W$ $(\Delta n_A/\Delta t<(\Delta n_E/\Delta t)_W)$, it is determined as the time $t_{Sync}$ at which the gradient of the input speed $dn_E/dt$ reaches the value of the gradient of the output speed $\Delta n_A/\Delta t$ $(dn_E/dt=\Delta n_A/\Delta t)$.

By differentiating the equation $n_E(t)=n_{E\_0}+\Delta n_E/\Delta t^*t+F_{Abs}^*t^2$, in which $n_{E\_0}$ is the input speed at the beginning of the disengagement process $(t_{Abs0})$ and $F_{Abs}$ is a characteristic disengagement factor determined in advance for the time variation of the disengagement process of the transmission brake (1), inserting the respective condition for reaching $t_{Sync}$ and solving for $t=t_{Sync}$, it is found that the optimum time $t_{Sync}$ for reaching the synchronous speed $n_{Syn}$ with a gradient of the output speed $\Delta n_A/\Delta t \geq (\Delta n_E/\Delta t)_W$ can be calculated from the equation:

$$t_{Sync}=-\tfrac{1}{2}F_{Abs}^*(\Delta n_E/\Delta t)_{Br}$$

and with a gradient of the output speed $\Delta n_A/\Delta t<(\Delta n_E/\Delta t)_W$ it can be calculated from the equation:

$$t_{Sync}=\tfrac{1}{2}F_{Abs}^*(\Delta n_A/\Delta t-\Delta n_E/\Delta t).$$

By differentiating the equation $n_E(t)=n_{E\_0}+\Delta n_E/\Delta t^*t-1/(2T_{Abs})^*(\Delta n_E/\Delta)_{Br}^*t^2 T_{Abs}$ is the disengagement duration of the transmission brake (1) assuming a linear decrease of the braking torque $(M_{Br}(t)=M_{Br\_0}(1-t/T_{Abs}))$, and $(\Delta n_E/\Delta t)_{Br}$ is the gradient of the input speed attributable to the braking torque $M_{Br0}$ of the transmission brake (1), inserting the respective condition for reaching $t_{Sync}$ and solving for $t=t_{Sync}$, it is found that the optimum time $t_{Sync}$ for reaching the synchronous speed $n_{Sync}$ can be calculated, alternatively, with a gradient of the output speed $\Delta n_A/\Delta t \geq (\Delta n_E/\Delta t)_W$ from the equation $t_{Sync}=T_{Abs}$, and with a gradient of the output speed $\Delta n_A/\Delta t<(\Delta n_E/\Delta t)_W$ from the equation:

$$t_{Sync}=T_{Abs}*(1+((\Delta n_E/\Delta t)_W-(\Delta n_A/\Delta t))/(\Delta n_E/\Delta t)_{Br})$$

whereas to calculate the synchronous time $t_{Sync}$ in accordance with the equation $n_E(t)=n_{E\_0}(M_{Br0}+M_W)/(J_{GE}*2\pi)*t-M_{Br0}/(J_{GE}*4\pi*T_{Abs})*t^2$ in which $M_{Br0}$ is the braking torque of the transmission brake (1) at the beginning of the disengagement process ($t_{Abs0}$), $M_W$ is a resistance torque acting on the input speed of the transmission during the upshift process, $J_{GE}$ is the mass moment of inertia of the rotating components of the input-side part of the transmission, $T_{Abs}$ is the disengagement duration of the transmission brake (1) assuming a linear decrease of the braking torque ($M_{Br}(t)=M_{Br\_0}(1-t/T_{Abs})$), or the aforesaid relationship for the constant gradients of the input speed $(\Delta n_E/\Delta t)_W$, $(\Delta n_E/\Delta t)_{Br}$ before the disengagement process, optionally instead of the term $(\Delta n_E/\Delta t)_W$ the term $M_W/(J_{GE}*2\pi)$ and instead of the term $(\Delta n_E/\Delta t)_{Br}$ the term $M_{Br0}/(J_{GE}*2\pi)$ can also be used.

To derive a formula for calculating the time interval until the emission of the disengagement signal $T_{SA}$ for opening the outlet valve of the transmission brake, it is first necessary to derive the time variations of the input speed $n_E(t)$ and the output speed $n_A(t)$, starting from the current point in time occurring within the phase with constant deceleration of the input speed $\Delta n_E/\Delta t$. For the input speed, having regard to the formula $n_E(t)=n_{E\_0}+\Delta n_E/\Delta t*t+F_{Abs}*t^2$, in which $n_{E\_0}$ is the input speed at the beginning of the disengagement process ($t_{Abs0}$) and $F_{Abs}$ is a characteristic disengagement factor determined in advance for the time variation of the disengagement process of the transmission brake (1), the corresponding relationship is:

$$n_{Sync}=n_E(t_{Sync})=n_{E\_akt}+\Delta n_E/\Delta t*(T_{SA}+T_{TA}+T_{Sync})+F_{Abs}*T_{Sync}^2$$

and for the output speed:

$$n_{Sync}=n_A(t_{Sync})=n_{A\_akt}+\Delta n_A/\Delta t*(T_{SA}+T_{TA}+T_{Sync})$$

in which $T_{SA}$ is the required time interval until the emission of the disengagement signal, $T_{TA}$ is the disengagement dead time between the emission of the disengagement signal and the beginning of the disengagement process, and $T_{Sync}$ is the time until the synchronous speed $n_{Sync}$ is reached during the disengagement process. By using the previously derived formulas for $t_{Sync}$, subtraction of the two formulas and solving for $T_{SA}$, it is found that the time until the emission of the disengagement signal $T_{SA}$ for opening the outlet valve, with an output speed gradient $\Delta n_A/\Delta t \geq (\Delta n_E/\Delta t)_W$, can be calculated from the equation:

$$T_{SA}=(n_{E\_Akt}-n_{A\_akt})/((\Delta n_A/\Delta t)-(\Delta n_E/\Delta t))-T_{TA}+\tfrac{1}{2}F_{Abs}*(\Delta n_E/\Delta t)_{Br}*(1+\tfrac{1}{2}(\Delta n_E/\Delta t)_{Br}/(\Delta n_A/\Delta t)-(\Delta n_E/\Delta t))$$

and with an output speed gradient $\Delta n_A/\Delta t<(\Delta n_E/\Delta t)_W$, from the equation:

$$T_{SA}=(n_{E\_akt}-n_{A\_akt})/((\Delta n_A/\Delta t)-(\Delta n_E/\Delta t))-T_{TA}-\tfrac{1}{4}F_{Abs}*((\Delta n_A/\Delta t)-(\Delta n_E/\Delta t)).$$

Such a procedure, with a formulation of the input-side synchronous speed $n_{Synch}=n_E(t_{Sync})$ having regard to the formula $n_E(t)=n_{E\_0}+\Delta n_E/\Delta t*t-1/(2T_{Abs})*(\Delta n_E/\Delta t)_{Br}*t^2 T_{Abs}$ is the disengagement duration of the transmission brake (1) assuming a linear decrease of the braking torque ($M_{Br}(t)=M_{Br\_0}(1-t/T_{Abs})$), and $(\Delta n_E/\Delta t)_{Br}$ is the gradient of the input speed attributable to the braking torque $M_{Br0}$ of the transmission brake (1) in accordance with:

$$n_{Sync}=n_{E\_akt}+\Delta n_E/\Delta t*(T_{SA}+T_{TA}+T_{Sync})-1/(2T_{Abs})*(\Delta n_E/\Delta t)_{Br}*T_{Sync}^2$$

shows that the time until the emission of the disengagement signal $T_{SA}$ for opening the outlet valve can be calculated, with an output speed gradient $\Delta n_A/\Delta t \geq (\Delta n_E/\Delta t)_W$, from the equation:

$$T_{SA}=(n_{E\_akt}-n_{A\_akt})/((\Delta n_A/\Delta t)-(\Delta n_E/\Delta t))-T_{TA}-T_{Abs}*(1+\tfrac{1}{2}(\Delta n_E/\Delta t)_{Br}/((\Delta n_A/\Delta t)-(\Delta n_E/\Delta t)))$$

and with an output speed gradient $\Delta n_A/\Delta t<(\Delta n_E/\Delta t)_W$, from the equation:

$$T_{SA}=(n_{E\_akt}-n_{A\_akt})/((\Delta n_A/\Delta t)-(\Delta n_E/\Delta t))-T_{TA}-\tfrac{1}{2}T_{Abs}*(1+((\Delta n_E/\Delta t)_W-(\Delta n_A/\Delta t))/(\Delta n_E/\Delta t)_{Br}).$$

In the case of an extremely small absolute value of the gradient of the output speed $\Delta n_A/\Delta t$, i.e. if the value of the output speed gradient is substantially smaller than the value of the input speed gradient ($|\Delta n_A/\Delta t|<<|\Delta n_E/\Delta t|$) and/or when the output speed gradient is almost equal to zero ($\Delta n_A/\Delta t \approx 0$), and when at the same time the resistance torque $M_W$ is negligibly small ($(\Delta n_E/\Delta t)_W=0$; $\Delta n_E/\Delta t=(\Delta n_E/\Delta t)_{Br}$), the above equations for calculating the time interval until the emission of the disengagement signal $T_{SA}$ can be greatly simplified, so that in that case the disengagement signal interval $T_{SA}$ can be calculated independently of the gradient of the output speed $\Delta n_A/\Delta t$, with sufficient accuracy, from the equation:

$$T_{SA}=(n_{A\_akt}-n_{E\_akt})/(\Delta n_E/\Delta t)-T_{TA}+\tfrac{1}{4}F_{Abs}*(\Delta n_E/\Delta t)$$

or from the equation:

$$T_{SA}=(n_{A\_akt}-n_{E\_akt})/(\Delta n_E/\Delta t)-T_{TA}-\tfrac{1}{2}T_{Abs}.$$

The gradient of the input speed $(\Delta n_E/\Delta t)_W$ attributable to the resistance torque $M_W$ is expediently determined after the gear under load has been disengaged and before the braking action of the transmission brake begins. This takes place preferably immediately after the opening of the inlet valve and the closing of the outlet valve, since at that time the loaded gear has been properly disengaged, a speed oscillation generated by the unloading pulse produced when the separator clutch is opened has largely decayed, and owing to the prefilling of the pressure space the braking action of the transmission brake has not yet started.

The parameters used for determining the speed variation of the input speed $n_E(t)$ during the disengagement process of the transmission brake, the optimum time $t_{Sync}$ for reaching the synchronous speed $n_{Sync}$ and the time interval $T_{SA}$ until the emission of the disengagement signal for opening the outlet valve of the transmission brake, such as the disengagement dead time $T_{TA}$ and/or the disengagement factor $F_{Abs}$ and/or the disengagement duration $T_{Abs}$ of the transmission brake, are expediently determined in advance as a function of at least one relevant operating parameter, i.e. one that influences the operating behavior of the transmission brake, and stored, appropriately parameterized, in a data memory of a transmission control unit of the transmission.

It is true that these parameters are largely equipment-specific and partially dependent on the respective mass moment of inertia $J_{GE}$ of the components in drive connection with the input speed of the transmission, or on the response behavior of the transmission brake as determined by the volume of the pressure space, the length and diameter of the unpressurized line and the flow cross-section of the outlet valve. However, if there is an auxiliary drive on the input side, the input-side mass moment of inertia can vary depending on whether an aggregate is or is not coupled thereto, and in the case of a group transmission with a splitter group connected upstream from the main transmission, depending on the shift condition of the splitter group, and this is taken into account in the present method.

Likewise, at least some of the parameters can vary as a function of free operating parameters such as the braking torque $M_{Br0}$ of the transmission brake produced by the brake pressure and/or the operating temperature of the transmission brake, and this too is taken into account in the present method.

For example, if the mass moment of inertia $J_{GE}$ on the input side is elevated or if the speed difference $n_E - n_A$ to be synchronized is large, then to synchronize the target gear a larger braking torque $M_{Br0}$ is set at the transmission brake by increasing the brake pressure, so that the synchronization and therefore the entire upshift process takes up about the same time as an upshift process with a lower mass moment of inertia $J_{GE}$ or one in which a smaller speed difference $n_E - n_A$ has to be synchronized.

A comparison of the quadratic terms in the equation $n_E(t) = n_{E\_0} + \Delta n_E/\Delta t^* t + F_{Abs}^* t^2$, in which $n_{E\_0}$ is the input speed at the beginning of the disengagement process ($t_{Abs0}$) and $F_{Abs}$ is a characteristic disengagement factor determined in advance for the time variation of the disengagement process of the transmission brake (1) and in the equation $n_E(t) = n_{E\_0} + \Delta n_E/\Delta t^* t - 1/(2T_{Abs})^* (\Delta n_E/\Delta t)_{Br}^* t^2 T_{Abs}$ is the disengagement duration of the transmission brake (1) assuming a linear decrease of the braking torque ($M_{Br}(t) = M_{Br\_0}(1 - t/T_{Abs})$), and $(\Delta n_E/\Delta t)_{Br}$ is the gradient of the input speed attributable to the braking torque $M_{Br0}$ of the transmission brake (1), shows that the disengagement factor $F_{Abs}$ is given by the term $-M_{Br0}/(J_{GE}^* 4\pi^* T_{Abs})$, so that the equation $F_{Abs} = -M_{Br0}/(J_{GE}^* 4\pi^* T_{Abs})$ applies. Accordingly, the disengagement factor $F_{Abs}$ behaves proportionally to the absolute value of the braking torque set $M_{Br0}$ ($F_{Abs} \sim |M_{Br0}|$) and inversely proportionally to the input-side mass moment of inertia $J_{GE}$ and the disengagement duration $T_{Abs}$ ($F_{Abs} \sim 1/J_{GE}$, $F_{Abs} \sim 1/T_{Abs}$).

However, since it has been shown empirically that the disengagement duration $T_{Abs}$ increases in proportion to the absolute value of the braking torque $M_{Br0}$, i.e. the ratio of the braking torque $M_{Br0}$ to the disengagement duration $T_{Abs}$ is constant ($M_{Br0}/T_{Abs}$=const.), without taking other operating parameters into account the disengagement factor $F_{Abs}$ behaves only inversely proportionally to the input-side mass moment of inertia $J_{GE}$ ($F_{Abs} \sim 1/J_{GE}$).

In particular the operating temperature of the transmission brake should be regarded as a further operating parameter that is relevant from this standpoint, since this has a substantial influence on the flow properties of the pressure medium, the frictional coefficient of the friction linings and the friction forces acting on the moving components of the actuating device of the transmission brake and hence on the operating behavior of the transmission brake. It is therefore provided that at least the operating temperature of the transmission brake, or in its place the operating temperature of the transmission, is used as a relevant operating parameter and detected by sensor means at the beginning of an upshift, and that in the determination of the speed variation of the input speed $n_E(t)$ during the disengagement process, of the optimum time $t_{Sync}$ for reaching the synchronous speed $n_{Sync}$ and of the time interval until the emission of the disengagement signal $T_{SA}$ for opening the outlet valve, in each case that value of the disengagement dead time $T_{TA}$ and/or the disengagement factor $F_{Abs}$ and/or the disengagement duration $T_{Abs}$ of the transmission brake, out of the stored values thereof, which is parametrically most closely associated with the measured temperature value, or a value obtained in relation to the measured temperature by interpolation from stored values, is used.

BRIEF DESCRIPTION OF THE DRAWINGS

To clarify the invention the description of a drawing illustrating an example embodiment is given below, the drawing showing:

FIG. 4: A schematic representation of the structure of a transmission brake.

DETAILED DESCRIPTION OF THE PREFERRED EMBODIMENTS

Figure 1:
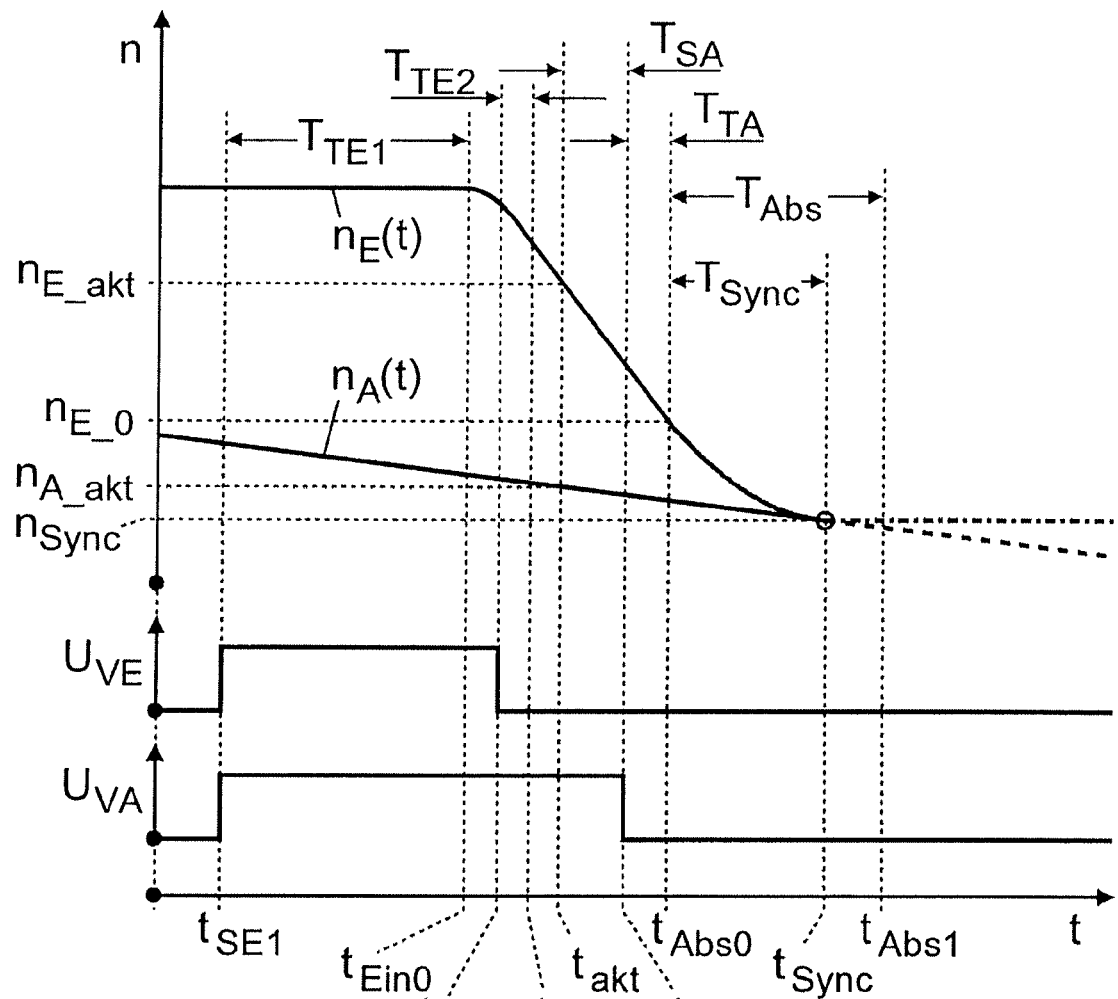
FIG. 1: The speed variations of the input and output speeds of an automated variable-speed transmission and the voltage variations of the magnetic switching valves of an associated transmission brake during an upshift.

FIG. 4 shows a typical transmission brake 1 in an automated transmission of countershaft design provided with claw clutches, with which the control method according to the invention can be used. The transmission brake is in the form of a hydraulically or pneumatically actuated disk brake and is in this case arranged at the engine-side end of a countershaft 2 of the transmission (which is not illustrated further). The inner and outer disks 3, 4 of the transmission brake 1 are connected in a rotationally fixed manner by way of inner and outer carrier teeth, in alternation to the countershaft 2 and to a brake housing 6 mounted on an end wall 5 of the transmission housing on the engine side. The transmission brake 1 is actuated by a piston 8 fitted to move axially in a brake cylinder 7, which is acted upon on the outside by the controllable control pressure in the pressure space 9 of the brake cylinder 7 and thereby pressed against the disks 3, 4 in opposition to the restoring force of a spring 10 positioned between the piston 8 and the countershaft 2. The control pressure acting in the pressure space 9 is regulated by means of an inlet valve 13 connected on the inlet side to a pressure line 11 carrying the pressure medium used and on the outlet side via a connecting line 12a to the pressure space 9, and by an outlet valve 15 connected at its inlet via a connecting line 12b to the pressure space 9 and at its outlet to an unpressurized line 14 leading to an oil sump or to a muffler. The two valves 13, 15 are each made as 2/2-way magnetic switching valves, such that in its non-actuated, i.e. non-energized, rest condition the inlet valve 13 is closed, and in its non-actuated, rest condition the outlet valve 15 is open.

An upshift of the transmission from a gear under load to a higher, target gear begins by reducing the load of the drive engine connected upstream from the transmission on its input side, and the approximately simultaneous opening of an engine clutch arranged between the driveshaft of the drive engine and the input shaft of the transmission. Thereafter, the target gear is synchronized by braking the countershaft 2 by means of the transmission brake 1. The corresponding time variations of the input-shaft-related input speed $n_E(t)$, the input-shaft-related output speed $n_A(t)$ and the switch conditions of the inlet valve 13 and the outlet valve 15, represented by their respective control voltage $U_{VE}(t)$, $U_{VA}(t)$, are shown as examples in FIG. 1.

To simplify the representation and the equations used, in this case it will be assumed that the resistance torque $M_W$ acting on the input shaft of the transmission is negligibly small, so that the gradient of the input speed $\Delta n_E/\Delta t$ before the engagement and after the disengagement process of the transmission brake 1 is equal to zero, and the constant gradient of the input speed $\Delta n_E/\Delta t$ after the engagement and before the disengagement process of the transmission brake is produced solely by the braking torque $M_{Br0}$ of the transmission brake which is constant during that phase $((\Delta n_E/\Delta t)_W=0; \Delta n_E/\Delta t=(\Delta n_E/\Delta t)_{Br})$.

First, at time $t_{SE1}$, the inlet valve 13 is opened and at the same time the outlet valve 15 is closed. Correspondingly, the control voltages $U_{VE}$, $U_{VA}$ of the inlet valve 13 and the outlet valve 15 increase at this time from zero to the switching value. The deceleration of the input shaft begins after the passage of a first engagement dead time $T_{TE1}$ that results essentially from the pre-filling of the pressure space 9 and the connecting lines 12a, 12b, namely at time $t_{Ein0}$. Shortly after this, at time $T_{SE2}$ the inlet valve 13 is closed again by switching off the control voltage $U_{VE}$, whereby the brake pressure present in the pressure space 9 is shut in. By virtue of this, after the passage of a relatively short, second engagement dead time $T_{TE2}$, at time $t_{Ein1}$ a largely constant braking torque $M_{Br0}$ is produced by the transmission brake 1, which leads to deceleration of the input shaft of the transmission, which is in driving connection via an input constant with the countershaft 2, at a largely constant gradient $\Delta n_E/\Delta t$ and thus with a linear decrease of the input speed $n_E(t)$.

During this phase, quite soon but at a time $t_{akt}$ which is arbitrary as such, the method according to the invention for determining the desired time point $t_{SA}$ or the desired interval $T_{SA}$ until the time $t_{SA}$ is reached begins, the time $t_{SA}$ being that at which a disengagement signal for opening the outlet valve 15, i.e. for disengaging the transmission brake 1, is emitted.

The disengagement time $t_{SA}$ or disengagement interval $T_{SA}$ should be determined as a function of the input speed $n_E$ and its gradient $\Delta n_E/\Delta t$, and of the output speed $n_A$ and its gradient $\Delta n_A/\Delta t$, in such manner that after the disengagement of the transmission brake 1 the input speed $n_E$ largely corresponds to the synchronous speed $n_{Sync}$ determined by the output speed ($n_E \approx n_A$).

In this case the method according to the invention takes into account a disengagement dead time $T_{TA}$ of the transmission brake 1 that exists in practice between the emission of the disengagement signal ($t_{SA}$) and the actual beginning of the disengagement process ($t_{Abs0}$), as well as the fact that the braking torque $M_{Br0}$ of the transmission brake 1, and hence the gradient of the input speed $\Delta n_E/\Delta t$ cannot be reduced abruptly to zero, but are reduced to zero during a disengagement process that takes place over a finite disengagement period $T_{Abs}$.

For this purpose, the speed variation of the input speed $n_E(t)$ to be expected during the disengagement process between times $t_{Abs0}$ and $t_{Abs1}$ is first determined by a quadratic time function, as a function of the previously constant gradient $\Delta n_E/\Delta t$. Under the assumption of a linear decrease of the braking torque in accordance with FIG. 2, which is described by the equation:

$$M_{Br}(t)=M_{Br0}(1-t/T_{Abs})$$

the speed variation of the input speed is obtained from the equation:

$$n_E(t)=n_{E\_0}+\Delta n_E/\Delta t * t - 1/(2T_{Abs}) * \Delta n_E/\Delta t * t^2,$$

in which $n_{E\_0}$ is the as-such unknown value of the input speed at the beginning of the disengagement process at time $t_{Abs0}$.

Figure 2:
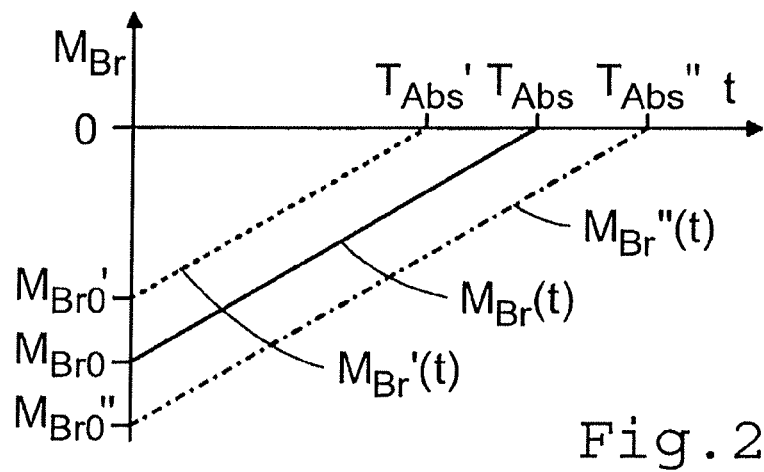
FIG. 2: The braking torque variation during a disengagement process of the transmission brake.

FIG. 2 also illustrates, by virtue of two additionally plotted time variations of two braking torques $M_{Br}'(t)$ and $M_{Br}''(t)$ during the disengagement process of the transmission brake, which have different initial torques $|M_{Br0}'|<|M_{Br0}|<|M_{Br0}''|$, that with a transmission brake 1 of the this design the disengagement duration $T_{Abs}$ behaves proportionally to the value of the braking torque $M_{Br0}$ existing at the beginning of the disengagement process, i.e. that the ratio of the initial braking torque to the disengagement duration $T_{Abs}$ $M_{Br0}/T_{Abs}$ is constant ($M_{Br0}'/T_{Abs}'=M_{Br0}/T_{Abs}=M_{Br0}''/T_{Abs}''$=const.).

Figure 3A:
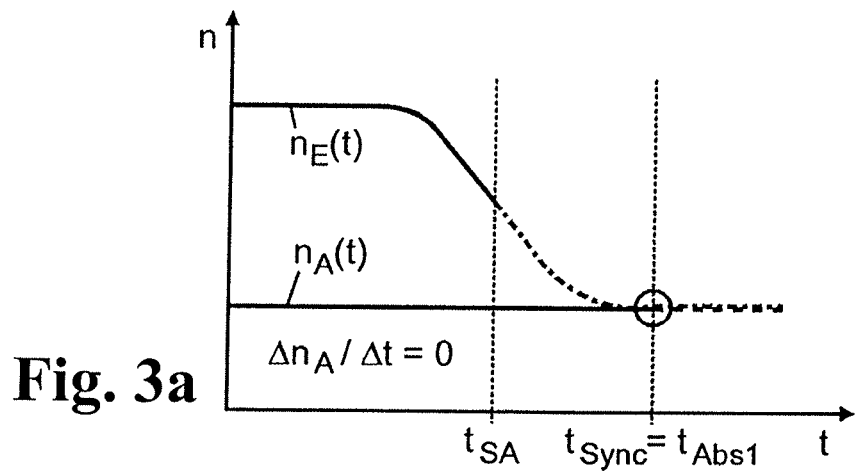
FIG. 3a, 3b, 3c: The possible speed variations of the input speed and the output speed of a transmission during an upshift, with various driving resistances.
Figure 3B:
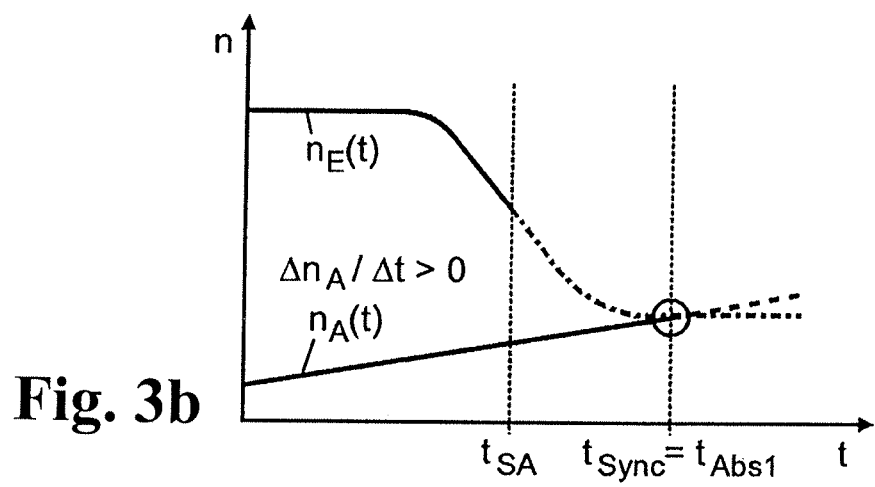
Figure 3C:
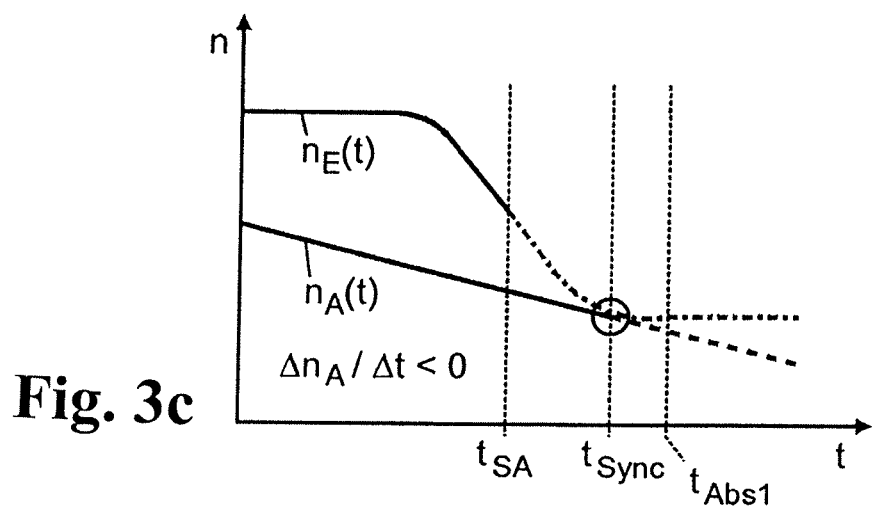

As a function of the gradient of the output speed $\Delta n_A/\Delta t$ the optimum time $t_{Sync}$ for reaching the synchronous speed $n_{Sync}$ is now determined. As illustrated in FIG. 3, depending on the value and direction of the resultant driving resistance, during the shift-related traction force interruption the output speed $n_A$ can remain constant ($\Delta n_A/\Delta t=0$, see FIG. 3a), increase ($\Delta n_A/\Delta t>0$, see FIG. 3b), or decrease ($\Delta n_A/\Delta t<0$, see FIG. 3c).

With a gradient of the output speed $\Delta n_A/\Delta t \geq 0$ the optimum time $t_{Sync}$ for reaching the synchronous speed $n_{Sync}$ is regarded as the time when the gradient of the input speed $dn_E/dt$ becomes zero ($dn_E/dt=0$).

With an output speed gradient $\Delta n_A/\Delta t<0$, as is also the case in the present application example according to FIG. 1, which can occur for example when driving on an uphill stretch, the optimum time $t_{Sync}$ for reaching the synchronous speed $n_{Sync}$ is regarded as the time when the gradient of the input speed $dn_E/dt$ reaches the gradient of the output speed $\Delta n_A/\Delta t$ ($dn_E/dt=\Delta n_A/\Delta t$).

Consequently, in the present application example the equation obtained for determining the synchronous time $t_{Sync}$ or the synchronization interval $T_{Sync}$ within the disengagement process of the transmission brake 1, i.e. from the time $t_{Abs0}$ onward, is:

$$T_{Sync}=T_{Abs}*(1-(\Delta n_A/\Delta t)/(\Delta n_E/\Delta t))$$

(the equation $t_{Sync}=T_{Abs}*(1+((\Delta n_E/\Delta t)_W)-(\Delta n_A/\Delta t))/(\Delta n_E/\Delta t)_{Br})$, according to which, with an assumed disengagement duration of $T_{Abs}=0.20$ sec, a constant input speed gradient, during the braking phase, of $\Delta n_E/\Delta t=-50$ sec$^{-2}$, and an output speed gradient, which can be regarded as constant, of $\Delta n_A/\Delta t=-5$ sec$^{-2}$, the time until the synchronous speed $n_{Sync}$ is calculated as $T_{Sync}=0.18$ sec. Accordingly, in this case the synchronous speed $n_{Sync}$ is reached 0.20–0.18 sec=0.02 sec before the end of the disengagement process, i.e. before the zero gradient of the input speed ($\Delta n_E/\Delta t$)=0 has been reached at time $t_{Abs1}$.

With an actual input speed of $n_{E\_akt}=2100$ min$^{-1}=35$ sec$^{-1}$, an actual output speed of $n_{A\_akt}=1500$ min$^{-1}=25$ sec$^{-1}$, and a disengagement dead time, determined in advance for example during the development of the vehicle or the fitting of the transmission, of $T_{TA}=0.04$ sec, the interval until the emission of the disengagement signal $T_{SA}$ for opening the outlet valve 15, i.e. until the disengagement of the transmission brake 1, is calculated in this application example from the equation:

$$T_{SA}=(n_{E\_akt}-n_{A\_akt})/((\Delta n_A/\Delta t)-(\Delta n_E/\Delta t))-T_{TA}-\tfrac{1}{2}T_{abs}*(1-\Delta n_A/\Delta t)/(\Delta n_E/\Delta t))$$

(the second equation in Claim 9), as $T_{SA}=0.09$ sec.

With the method according to the invention the time $t_{SA}$ when the disengagement signal is emitted or the interval $T_{SA}$ until the disengagement signal is emitted are determined, while taking account of all the influencing factors, with such accuracy that the synchronous speed $n_{Sync}$ is reached with great precision at time $t_{Sync}$, i.e. the input speed $n_E$ corresponds to the output speed $n_A$ ($n_E=n_A$).

In order, during the subsequent engagement of the gear clutch of the target gear, to avoid a tooth-on-tooth position between the two halves of the clutch and to enable an automatic elimination of any tooth-on-tooth position that may occur, a desired minimum speed difference at the gear clutch can be produced by emitting the disengagement signal for opening the outlet valve 15 with a small time offset, for example $\Delta t_{SA}$=0.01 sec too early or too late.

INDEXES

1 Transmission brake
2 Countershaft
3 Inner disks
4 Outer disks
5 End wall
6 Brake housing
7 Cylinder
8 Piston
9 Pressure space
10 Spring
11 Pressure line
12a, 12b Connecting lines
13 Inlet valve
14 Unpressurized line
15 Outlet valve
$F_{Abs}$ Disengagement factor
i Order number
i-1 Order number
$J_{GE}$ Mass moment of inertia on the input side
M Torque
$M_{Br}$ Braking torque (in general, variable)
$M_{Br}'$ Braking torque (in general, variable)
$M_{Br}''$ Braking torque (in general, variable)
$M_{Br0}$ Constant braking torque
$M_{Br0}'$ Constant braking torque
$M_{Br0}''$ Constant braking torque
$M_W$ Constant resistance torque
n Rotation speed
$n_A$ Output speed
$n_{A\_akt}$ Current value of the output speed
$n_{A\_i}$ Output speed at time $t_i$
$n_{A\_i-1}$ Output speed at time $t_{i-1}$
$n_E$ Input speed
$n_{E\_0}$ Input speed at time $t_{Abs0}$
$n_{E\_akt}$ Current input speed value
$n_{E\_i}$ Input speed at time $t_i$
$n_{E\_i-1}$ Input speed at time $t_{i-1}$
t Time, time point
$t_{Abs0}$ Beginning of the disengagement process
$t_{Abs1}$ End of the disengagement process
$t_{akt}$ Current time point
$t_{Ein0}$ Beginning of the engagement process
$t_{Ein1}$ End of the engagement process
$t_i$ Determining time point
$t_{i-1}$ Prior time point
$t_{SA}$ Time point of the disengagement signal
$t_{SE1}$ First engagement signal time
$t_{SE2}$ Second engagement signal time
$t_{Sync}$ Synchronization time
T Time, time period, time interval
$T_{Abs}$ Duration of the disengagement
$T_{Abs}'$ Duration of the disengagement
$T_{Abs}''$ Duration of the disengagement
$T_{SA}$ Disengagement signal period
$T_{Sync}$ Synchronization time
$T_{TA}$ Disengagement dead time
$T_{TE1}$ First engagement dead time
$T_{TE2}$ Second engagement dead time
U Electric voltage
$U_{VA}$ Control voltage for 15
$U_{VE}$ Control voltage for 13
$\Delta n_A/\Delta t$ Constant gradient of the output speed
$dn_E/dt$ Variable gradient of the input speed
$\Delta n_E/\Delta t$ Constant gradient of the input speed (overall)
$(\Delta n_E/\Delta t)_{Br}$ Constant gradient of the input speed (produced by the transmission brake)
$(\Delta n_E/\Delta t)_W$ Constant gradient of the input speed (produced by a resultant resistance torque)
$\Delta t_{SA}$ Time interval

The invention claimed is:

1. A method of controlling a transmission brake in an automated variable-speed transmission of countershaft design and comprising claw clutches, the transmission brake being functionally connected to a transmission shaft (2) on an input side and being either hydraulically or pneumatically actuated by an inlet valve (13) and an outlet valve (15), each of the inlet valve (13) and the outlet valve (15) being a 2/2-way magnetic switching valve such that, for an upshift from a gear under load to a target gear, once a loaded gear is disengaged, for synchronizing the target gear, the inlet valve (13) being first opened and the outlet valve (15) being closed, and after a braking torque ($M_{Br0}$) is applied, the inlet valve (13) is closed, and during the braking of the input-side transmission shaft (2), a time interval until the emission of a disengagement signal ($T_{SA}$), for opening the outlet valve (15), is determined as a function of an input speed ($n_E$) and a gradient ($\Delta n_E/\Delta t$) of the input speed and an output speed ($n_A$) and a gradient ($\Delta n_A/\Delta t$) of the output speed, in such manner that when the transmission brake (1) is disengaged, the input speed ($n_E$) corresponds to a specified synchronous speed ($n_E \approx n_A$), the method comprising the steps of:

determining, with sensors, a current actual input speed ($n_{E\_akt}$) and a current actual output speed ($n_{A\_akt}$) and calculating the gradients of the input speed ($\Delta n_E/\Delta t$) and the output speed ($\Delta n_A/\Delta t$) from the current actual input speed ($n_{E\_akt}$) and the current actual output speed ($n_{A\_akt}$);

determining a speed variation of the input speed ($n_E(t)$), during an imminent disengagement process of the transmission brake (1), by a quadratic time function as a function of the gradient of the input speed ($\Delta n_E/\Delta t$);

determining an optimum time ($t_{Sync}$) for reaching a synchronous speed ($n_{Sync}$), during the disengagement process of the transmission brake (1), from a speed variation of the input speed ($n_E(t)$) as a function of the gradient of the output speed ($\Delta n_A/\Delta t$);

determining the time interval ($T_{SA}$) until emission of the disengagement signal as a function of the current actual input speed ($n_{E\_akt}$) and the gradient ($\Delta n_E/\Delta t$) of the current actual input speed and the current actual output speed ($n_{A\_akt}$) and the gradient ($\Delta n_A/\Delta t$) of the current actual output speed, by a back-calculation from the time ($t_{Sync}$) when the synchronous speed ($n_{Sync}$) is reached, taking a disengagement dead time ($T_{TA}$) of the transmission brake (1), between the emission of the disengagement signal ($t_{SA}$) and the beginning of the disengagement process ($t_{Abs0}$), into account.

2. The method according to claim 1, further comprising the step of considering the gradient of the input speed ($\Delta n_E/\Delta t$), until a beginning of the disengagement process ($t_{Abs0}$) and the gradient of the output speed ($\Delta n_A/\Delta t$), until the synchronous speed ($n_{Sync}$) is reached, to be constant and calculated as a difference quotient of two actual, consecutively measured speed values ($n_{E\_i}$, $n_{E\_i-1}$; $n_{A\_i}$, $n_{A\_i-1}$) and the time interval between the measurement of these speed values ($t_i-t_{i-1}$) ($\Delta n_E/\Delta t=(n_{E\_i}, n_{E\_i-1})/(t_i-t_{i-1})$, $\Delta n_A/\Delta t=(n_{A\_i}, n_{A\_i-1})/(t_i-t_{i-1})$).

3. The method according to claim 1, further comprising the step of determining the optimum time ($t_{Sync}$) for reaching the synchronous speed ($n_{Sync}$), with a gradient of the output speed either greater than or equal to a gradient of the input speed attributable to a resultant resistance torque $M_W$ ($\Delta n_A/\Delta t \geq (\Delta n_E/\Delta t)_W$), as the time ($t_{Sync}$) at which the gradient of the input speed $dn_E/dt$ reaches the value of the gradient ($\Delta n_E/\Delta t)_W(\Delta n_E/\Delta t=(\Delta n_E/\Delta t)_W)$, and with a gradient of the output speed smaller than the gradient of the input speed attributable to the resistance torque ($M_W(\Delta n_A/\Delta t<(\Delta n_E/\Delta t)_W)$), as the time ($t_{Sync}$) at which the gradient of the input speed ($dn_E/dt$) reaches the value of the gradient of the output speed ($\Delta n_A/\Delta t$ ($\Delta n_E/\Delta t=\Delta n_A/\Delta t$)).

4. The method according to claim 1, further comprising the step of determining the input speed gradient (($\Delta n_E/\Delta t)_W$) attributable to the resistance torque ($M_W$) after the gear under load is disengaged and before the braking action of the transmission brake (1) commences.

5. The method according to claim 4, further comprising the step of determining the input speed gradient (($\Delta n_E/\Delta t)_W$) attributable to the resistance torque ($M_W$) after the gear under load is disengaged and immediately after opening of the inlet valve (13) and closing of the outlet valve (15).

6. The method according to claim 1, further comprising the step of determining at least one of the disengagement dead time ($T_{TA}$), the disengagement factor ($F_{Abs}$), and the disengagement duration ($T_{Abs}$) of the transmission brake (1) in advance as functions of at least one relevant operating parameter, and stored, appropriately parameterized, in a data memory of a transmission control device of the transmission.

7. The method according to claim 6, further comprising the step of utilizing, as a relevant operating parameter, at least either an operating temperature of the transmission brake (1) or an operating temperature of the transmission, determined by sensor means at a beginning of the upshift, determining the speed variation of the input speed ($n_E(t)$) during the disengagement process, of the optimum time ($t_{Sync}$) for reaching the synchronous speed ($n_{Sync}$), and of the time interval until the emission of the disengagement signal ($T_{SA}$) for opening the outlet valve (15), in each case the respective value of the at least one of the disengagement dead time ($T_{TA}$), the disengagement factor ($F_{Abs}$), and the disengagement duration ($T_{Abs}$) of the transmission brake (1) used is the stored value thereof parametrically most closely associated with either the measured temperature or a value, for the measured temperature, obtained by interpolation from the stored values.

8. A method of controlling a transmission brake in an automated variable-speed transmission of countershaft design and comprising claw clutches, the transmission brake being functionally connected to a transmission shaft (2) on an input and being either hydraulically or pneumatically actuated by an inlet valve (13) and an outlet valve (15), each of the inlet valve (13) and the outlet valve (15) being a 2/2-way magnetic switching valve such that, for an upshift from a gear under load to a target gear, once a loaded gear is disengaged, for synchronizing the target gear,
the inlet valve (13) being first opened and the outlet valve (15) being closed, and
after a braking torque ($M_{Br0}$) is applied, the inlet valve (13) is closed, and during the braking of the input-side transmission shaft (2), a time interval until the emission of a disengagement signal ($T_{SA}$), for opening the outlet valve (15), is determined as a function of an input speed ($n_E$) and a gradient ($\Delta n_E/\Delta t$) of the input speed and an output speed ($n_A$) and a gradient ($\Delta n_A/\Delta t$) of the output speed, in such manner that when the transmission brake (1) is disengaged, the input speed ($n_E$) corresponds to a specified synchronous speed ($n_E \approx n_A$), and the method comprising the steps of:

determining, with sensors, a current actual input speed ($n_{E\_akt}$) and a current actual output speed ($n_{A\_akt}$) and calculating the gradients of the input speed ($\Delta n_E/\Delta t$) and the output speed ($\Delta n_A/\Delta t$) from the current actual input speed ($n_{E\_akt}$) and the current actual output speed ($n_{A\_akt}$);

determining a speed variation of the input speed ($n_E(t)$), during an imminent disengagement process of the transmission brake (1), by a quadratic time function as a function of the gradient of the input speed ($\Delta n_E/\Delta t$);

determining an optimum time ($t_{Sync}$) for reaching a synchronous speed ($n_{Sync}$), during the disengagement process of the transmission brake (1), from a speed variation of the input speed ($n_E(t)$) as a function of the gradient of the output speed ($\Delta n_A/\Delta t$);

determining the time interval ($T_{SA}$) until emission of the disengagement signal as a function of the current actual input speed ($n_{E\_akt}$) and the gradient ($\Delta n_E/\Delta t$) of the current actual input speed and the current actual output speed ($n_{A\_akt}$) and the gradient ($\Delta n_A/\Delta t$) of the current actual output speed, by a back-calculation from the time ($t_{Sync}$) when the synchronous speed ($n_{Sync}$) is reached, taking a disengagement dead time ($T_{TA}$) of the transmission brake (1), between the emission of the disengagement signal ($t_{SA}$) and the beginning of the disengagement process ($t_{Abs0}$), into account, and determining the speed variation of the input speed ($n_E(t)$) during the disengagement process of the transmission brake (1) from a time function comprising one of:

$$n_E(t) = n_{E\_0} + \Delta n_E/\Delta t * t + F_{Abs} * t^2,$$

$$n_E(t) = n_{E\_0} + (M_{Br0} + M_W)/(J_{GE} * 4\pi * T_{Abs}) * t^2,$$

and $$n_E(t) = n_{E\_0} + \Delta n_E/\Delta t * t - 1/(2T_{Abs}) * (\Delta n_E/\Delta t)_{Br} * t^2,$$

in which
$n_{E\_0}$ is the input speed at the beginning of the disengagement process ($t_{Abs0}$),
$F_{Abs}$ is a characteristic disengagement factor determined in advance for the time variation of the disengagement process of the transmission brake (1),
$M_{Br0}$ is a braking torque of the transmission brake (1) at the beginning of the disengagement process ($t_{Abs0}$),
$M_W$ is a resistance torque acting on the input speed of the transmission during the upshift process,
$J_{GE}$ is a mass moment of inertia of rotating components of an input-side part of the transmission,
$T_{Abs}$ is a disengagement duration of the transmission brake (1) assuming a linear decrease of the braking torque ($M_{Br}(t) = M_{Br\_0}(1-t/T_{Abs})$), and
($\Delta n_E/\Delta t)_{Br}$ is the gradient of the input speed attributable to the braking torque $M_{Br0}$ of the transmission brake (1).

9. The method according to claim 8, further comprising the step of determining the speed variation of the input speed ($n_E(t)$) during the disengagement process of the transmission brake from the time function $$n_E(t) = n_{E\_0} + \Delta n_E/\Delta t * t + F_{Abs} * t^2.$$

10. The method according to claim 8, further comprising the step of determining the speed variation of the input speed ($n_E(t)$), during the disengagement process of the transmission brake (1), from either the time function $$n_E(t) = n_{E\_0} + (M_{Br0} + M_W)/(J_{GE} \cdot 2\pi) \cdot t - M_{Br0}/(J_{GE} \cdot 4\pi \cdot T_{Abs}) \cdot t^2$$

or the time function $$n_E(t) = n_{E\_0} + \Delta n_E/\Delta t \cdot t - 1/(2T_{Abs}) \cdot (\Delta n_E/\Delta t)_{Br} \cdot t^2.$$

11. The method according to claim 9, further comprising the step of calculating the optimum time ($t_{Sync}$) for reaching synchronous speed ($n_{Sync}$), with an output speed gradient ($\Delta n_A/\Delta t \geq (\Delta n_E/\Delta t)_W$) from the equation:

$$t_{Sync} = -1/2 F_{Abs} \cdot (\Delta n_E/\Delta t)_{Br},$$

and with an output speed gradient ($\Delta n_A/\Delta t < (\Delta n_E/\Delta t)_W$) from the equation:

$$t_{Sync} = 1/2 F_{Abs} \cdot (\Delta n_A/\Delta t - \Delta n_E/\Delta t).$$

12. The method according to claim 10, further comprising the step of calculation the optimum time ($t_{Sync}$) for reaching the synchronous speed ($n_{Sync}$), with an output speed gradient ($\Delta n_A/\Delta t \geq (\Delta n_E/\Delta t)_W$) from the equation:

$$t_{Sync} = T_{Abs},$$

and with an output speed gradient ($\Delta n_A/\Delta t < (\Delta n_E/\Delta t)_W$) from the equation:

$$t_{Sync} = T_{Abs} \cdot (1 + ((\Delta n_E/\Delta t)_W - (\Delta n_E/\Delta t))/(\Delta n_E/\Delta t)_{Br}).$$

13. The method according to claim 9, further comprising the step of calculating the time, until the emission of the disengagement signal ($T_{SA}$) for opening the outlet valve (15), with an output speed gradient ($\Delta n_A/\Delta t \geq (\Delta n_E/\Delta t)_W$) from the equation:

$$T_{SA} = (n_{E\_akt} - n_{A\_akt})/((\Delta n_A/\Delta t) - (\Delta n_E/\Delta t)) - T_{TA} + 1/2F_{Abs} \cdot (\Delta n_E/\Delta t)_{Br} \cdot (1 + 1/2(\Delta n_E/\Delta t)_{Br}/((\Delta n_A/\Delta t) - (\Delta n_E/\Delta t)))$$

and with an output speed gradient ($\Delta n_A/\Delta t < (\Delta n_E/\Delta t)_W$) from the equation:

$$T_{SA} = (n_{E\_akt} - n_{A\_akt})/((\Delta n_A/\Delta t) - (\Delta n_E/\Delta t)) - T_{TA} - 1/4F_{Abs} \cdot ((\Delta n_A/\Delta t) - (\Delta n_E/\Delta t)).$$

14. The method according to claim 10, further comprising the step of calculating the time until the emission of the disengagement signal ($T_{SA}$) for opening the outlet valve (15), with an output speed gradient ($\Delta n_A/\Delta t \geq (\Delta n_E/\Delta t)_W$) from the equation:

$$T_{SA} = (n_{E\_akt} - n_{A\_akt})/((\Delta n_A/\Delta t) - (\Delta n_E/\Delta t)) - T_{TA} - T_{Abs} \cdot (1 + 1/2(\Delta n_E/\Delta t)_{Br}/((\Delta n_A/\Delta t) - (\Delta n_E/\Delta t)))$$

and with an output speed gradient ($\Delta n_A/\Delta t < (\Delta n_E/\Delta t)_W$) from the equation:

$$T_{SA} = (n_{E\_akt} - n_{A\_akt})/((\Delta n_A/\Delta t) - (\Delta n_E/\Delta t)) - T_{TA} - 1/2T_{Abs} \cdot (1 + ((\Delta n_E/\Delta t)_W - (\Delta n_A/\Delta t))/(\Delta n_E/\Delta t)_{Br}).$$

15. The method according to claim 9, further comprising the step of calculating the time until the emission of the disengagement signal ($T_{SA}$) for opening the outlet valve (15), if the absolute value of the output speed gradient is extremely small ($|\Delta n_A/\Delta t| \ll |\Delta n_E/\Delta t|$ and/or $\Delta n_A/\Delta t \approx 0$) and if, at a same time, a resistance torque ($M_W$) is negligibly small (($\Delta n_E/\Delta t)_W = 0$; $\Delta n_E/\Delta t = (\Delta n_E/\Delta t)_{Br}$), from either the equation:

$$T_{SA} = n_{A\_akt} - n_{E\_akt})/(\Delta n_E/\Delta t) - T_{TA} + 1/4F_{Abs} \cdot (\Delta n_E/\Delta t)$$

or from the equation:

$$T_{SA} = (n_{A\_akt} - n_{E\_akt})/(\Delta n_E/\Delta t) - T_{TA} - 1/2F_{Abs}.$$

16. The method according to claim 8, further comprising the step of considering the gradient of the input speed ($\Delta n_E/\Delta t$), until a beginning of the disengagement process ($t_{Abs0}$), and the gradient of the output speed ($\Delta n_A/\Delta t$), until the synchronous speed ($n_{Sync}$) is reached, to be constant and calculated as a difference quotient of two actual, consecutively measured speed values ($n_{E\_i}, n_{E\_i-1}; n_{A\_i}, n_{A\_i-1}$) and the time interval between the measurement of these speed values ($t_i - t_{i-1}$)($\Delta n_E/\Delta t = (n_{E\_i}, n_{E\_i-1})/(t_i - t_{i-1})$, $\Delta n_A/\Delta t = (n_{A\_i}, n_{A\_i-1})/(t_i - t_{i-1})$).

17. The method according to claim 8, further comprising the step of determining the optimum time ($t_{Sync}$) for reaching the synchronous speed ($n_{Sync}$), with a gradient of the output speed either greater than or equal to a gradient of the input speed attributable to a resultant resistance torque $M_W$ ($\Delta n_A/\Delta t \geq (\Delta n_E/\Delta t)_W$), as the time ($t_{Sync}$) at which the gradient of the input speed $dn_E/dt$ reaches the value of the gradient ($\Delta n_E/\Delta t)_W(\Delta n_E/\Delta t = (\Delta n_E/\Delta t)_W$), and with a gradient of the output speed smaller than the gradient of the input speed attributable to the resistance torque ($M_W$ ($\Delta n_A/\Delta t < (\Delta n_E/\Delta t)_W$)), as the time ($t_{Sync}$) at which the gradient of the input speed ($dn_E/dt$) reaches the value of the gradient of the output speed ($\Delta n_A/\Delta t$ ($\Delta n_E/\Delta t = \Delta n_A/\Delta t$)).

18. The method according to claim 8, further comprising the step of determining the input speed gradient (($\Delta n_E/\Delta t)_W$) attributable to the resistance torque ($M_W$) after the gear under load is disengaged and before the braking action of the transmission brake (1) commences.

19. The method according to claim 18, further comprising the step of determining the input speed gradient (($\Delta n_E/\Delta t)_W$) attributable to the resistance torque ($M_W$) after the gear under load is disengaged and immediately after opening of the inlet valve (13) and closing of the outlet valve (15).

20. The method according to claim 8, further comprising the step of determining at least one of the disengagement dead time ($T_{TA}$), the disengagement factor ($F_{Abs}$), and the disengagement duration ($T_{Abs}$) of the transmission brake (1) in advance as functions of at least one relevant operating parameter, and stored, appropriately parameterized, in a data memory of a transmission control device of the transmission.

* * * * *